Dec. 10, 1957   F. H. MUELLER   2,815,766
LUBRICATED ROTARY PLUG VALVE
Filed April 25, 1955
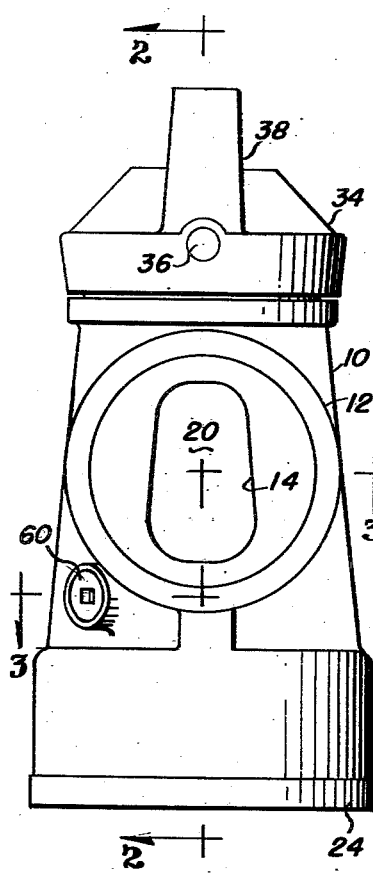
FIG.1.
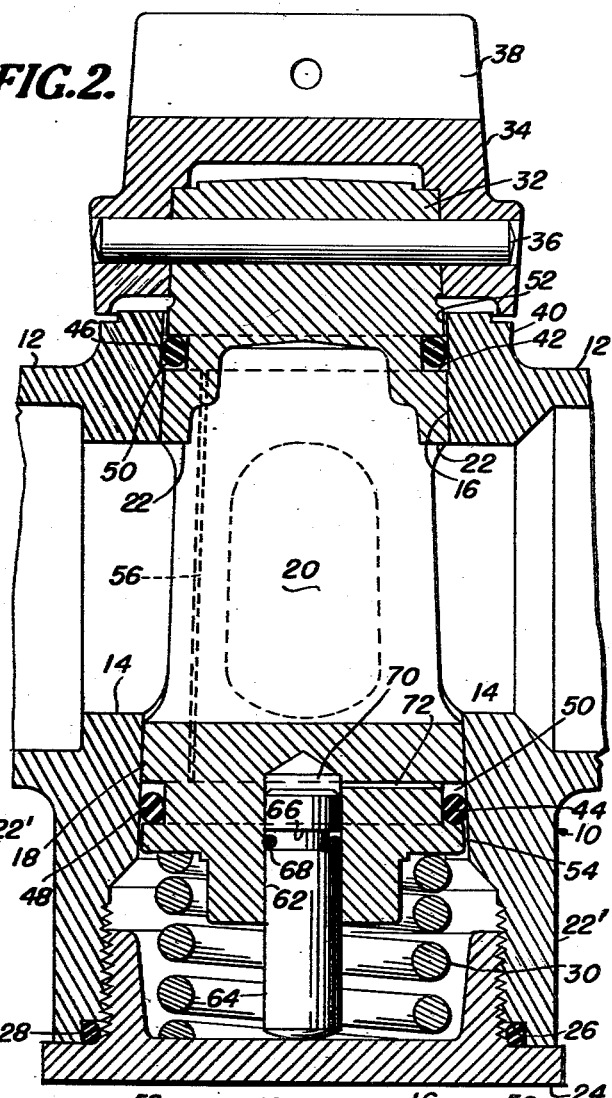
FIG.2.
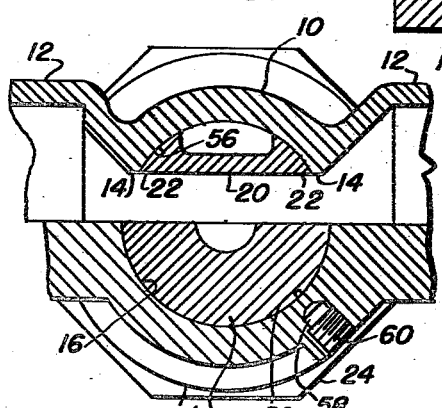
FIG.3.
FIG.4.   FIG.5.
INVENTOR
FRANK H. MUELLER
BY Cushman, Darby & Cushman
ATTORNEYS

United States Patent Office 2,815,766
Patented Dec. 10, 1957

2,815,766

LUBRICATED ROTARY PLUG VALVE

Frank H. Mueller, Decatur, Ill., assignor to Mueller Co., Decatur, Ill., a corporation of Illinois Application April 25, 1955, Serial No. 503,686

10 Claims. (Cl. 137—246.15)

This invention relates to rotary plug values, and more particularly to lubricated tapered rotary plug valves provided with means for yieldingly urging the valve plug into seating engagement with the valve seat.

In many types of tapered rotary plug valves wherein a system of longitudinal lubricant channels or grooves interrupts the opposed surfaces of the plug and seat, the introduction of lubricant under pressure into such system develops an unseating force on the plug because of the taper of the seat and plug. In many instances wherein a spring or line pressure is employed to yieldingly seat the plug, such a lubricant pressure unseating force may be large enough to overcome the spring or line pressure and actually unseat the plug, with consequent loss of lubricant pressure and some dissipation of the lubricant. If the plug is seated by a relatively strong spring, or by high line pressure, a correspondingly high lubricant pressure must be had before the plug will actually be unseated. Nevertheless, in many instances it is desirable to introduce lubricant under very high pressure into a lubricated, tapered, rotary plug valve of the aforedescribed type.

As example of such a valve wherein a high lubricant pressure is desired is that used for controlling the supply of gas from a street main into a service line leading to a dwelling. Such valves, which are known in the art as "curb stops," are usually buried underground, and, consequently, are quite inaccessible for lubricant replenishment. In curb stops presently in use, however, when an attempt is made to introduce lubricant under high pressure into the valve, the plug usually becomes unseated sufficiently to extrude the lubricant from the lubricant groove or channel system between the opposed surfaces of the plug and seat and, thence, into the valve casing ports. Such a result obviously dissipates lubricant as well as resulting in a complete loss of lubricant pressure.

The aforedescribed result is most undesirable in a valve of the type which has a lubricant pressure accumulator so that lubricant can be stored under pressure in the valve to thereby maintain a pressure supply of lubricant for the lubricating system of the valve.

Accordingly, it is an object of this invention to provide a lubricated, tapered rotary plug valve of the aforedescribed type with means to counteract the unseating force on the plug occasioned by the charging of the valve with lubricant under pressure.

It is another object of this invention to provide a lubricated, tapered rotary plug valve with simple and economical means for accomplishing the foregoing object.

Other objects and advantages of the invention will become apparent from the following description and accompanying drawings in which:

Fig. 1 is an end elevational view of a rotary plug valve embodying this invention.

Fig. 2 is an enlarged, fragmentary, sectional view taken substantially on line 2—2 of Fig. 1.

Fig. 3 is a fragmentary, sectional view taken substantially on line 3—3 of Fig. 1.

Figs. 4 and 5 are enlarged, fragmentary views of corresponding portions of Fig. 2, but illustrating the effects of lubricant pressure on certain of the parts.

Referring now to the drawings, the principles of this invention have been illustrated by incorporation in a rotary plug valve of the type known as an "invented curb stop," an example of which is illustrated and described somewhat more in detail in the patent to Mueller et al. 2,642,257, dated June 16, 1953. The valve illustrated herein also embodies a lubricant system of the type illustrated and described more in detail in the patent to Mueller 2,653,791, dated September 29, 1953. It will be realized, however, that the particular valve and lubricant system shown and described hereinafter are for purposes of illustration only and not of limitation.

The valve shown in the drawings has a casing provided with aligned opposite nipples 12 adapted to be connected into a line (not shown) and having aligned ports 14 opening into opposite sides of a tapered plug seat 16. Rotatably mounted in the seat 16 is a correspondingly tapered valve plug 18 having a through passageway 20 provided with ports 22 at its opposite ends adapted to be moved, by rotation of the plug, into or out of alignment with the casing ports 14 to open or close the valve. At the larger end of the valve seat 16, the casing 10 is provided with an annular extension 22' having threaded thereinto a plug-like closure cap 24. Preferably, the rim of the casing extension 22 is recessed at its inner edge, as at 26, for the reception of an O-ring 28 to seal with an overlying peripheral edge portion of the closure cap 24. The larger end of the valve plug 18 terminates within the extension 22 of the casing, and interposed between such plug and the closure cap 24 is a coil compression spring 30 for yieldably urging the plug 18 into engagement with its seat 16.

The smaller end of the plug 18 has an integral extension projecting out of the casing 10 at the smaller end of the seat 16 to form a shank 32 having a cap member 34 secured thereto by a pin 36. The cap member 34 has a flattened portion 38 for engagement by an appropriate tool (not shown) to rotate the plug 18 to open and close the valve. Although not shown in the drawings but shown, for example, in the aforementioned Patent No. 2,642,257, the cap member 34 and the annular portion 40 of the casing 10 surrounding the smaller end of the seat 16 are provided with inter-engageable stop members to limit rotation of the plug 18 to substantially 90° between open and closed positions on the valve. It also will be noted that the cap member 34 and the annular portion 40 of the casing are spaced apart slightly, so that if the plug 18 becomes seized in its seat 16, it can be freed by tapping the cap member to thereby slightly unseat the plug.

The lubricant system of the valve, which is disclosed with somewhat more particularity in the aforementioned Mueller Patent 2,653,791, includes circumferential grooves 42 and 44 in the plug 18 opposed to the seat 16 at the smaller and at the larger ends thereof, respectively. Preferably, such grooves 42 and 44 are substantially rectangular in radial section. Disposed in the grooves 42 and 44 are resilient pressure-deformable packing rings 46 and 48, respectively, preferably circular in radial section, when relaxed, and known in the art as O-rings. The grooves 42 and 44 preferably are somewhat wider than the thickness of their corresponding rings 46 and 48 to leave an annular space 50 between each ring and the inner side wall of its groove. Additionally, the diameter of each ring 46 and 48 in radial section is slightly greater than the radial distance between the bottom of its groove and the opposed surface of the plug seat 16, so that when each ring is positioned in its groove, it is deformed slightly and will contact both the bottom of its groove and the opposed surface of the plug seat. Between the grooves 42 and 44, the annular opposed surfaces of the plug 18 and seat 16 are in sealing engagement, i. e. substantially in metal-to-metal contact, while outwardly of the O-ring groove 42 at the smaller end of the plug the seat 16 is relieved slightly, as indicated at 52, and outwardly of the O-ring groove 44 at the larger end of the plug, the plug 18 is relieved slightly as at 54, for reasons described in detail in the aforementioned Mueller Patent 2,653,791.

A pair of diametrically opposite grooves or channels 56 (Figure 3) extend longitudinally in the surface of the plug 18 between the O-ring grooves 42 and 44 and connect the latter to form with the annular spaces 50 at the inner sides of the O-rings 46 and 48 a closed lubricant system. The longitudinal lubricant channels 56 and the aforementioned inter-engageable stops on the cap member 34 and the casing portion 40 are so arranged that the longitudinal lubricant channels will not sweep by a casing port 14 when the valve plug 18 is moved between its open and closed positions to thereby avoid the extrusion of lubricant from such channel into a casing port. Nevertheless, it will be seen that such channels 56 will sweep substantially the entire circumference of the valve seat 16 during opening and closing movements of the valve to thereby spread a very thin film of lubricant between substantially all of the sealingly-engaged opposed surfaces of the valve plug 18 and its seat 16.

A lubricant charging port 58 (Figure 3) extends through the casing 10 in alignment with one of the plug channels 56 in the open position of the valve so that lubricant can be forced under pressure into such port, and consequently throughout the entire lubricant system. Any appropriate means may be employed to introduce lubricant under pressure through the charging port 58. For example, the outer portion of the port 58 may be enlarged and interiorly threaded for the reception of a closure plug 60. Hence, on removal of the closure plug 60, the enlarged portion of the charging port 58 may be filled with lubricant and by replacing and tightening the closure plug such lubricant can be forced at high pressure into the lubricant system.

As is described more in detail in the aforementioned patent to Mueller 2,653,791, the introduction of lubricant under high pressure into the O-ring grooves 42 and 44 at the inner sides of the O-rings 46 and 48 therein, serves to deform each ring and squeeze it outwardly into tight sealing engagement with the plug 18 and its seat 16 at the corner formed by the outer side wall of the corresponding groove and the opposed surface of the valve seat, as shown in Figures 4 and 5. Moreover, because the O-rings 46 and 48 are resilient, they constantly tend to resume their original circular configuration in radial section, and thereby to maintain pressure on the lubricant in the system.

It will be seen that when lubricant under high pressure is introduced into the aforedescribed lubricant system, it exerts a pressure force against the bottom of the longitudinal channels 56 in the plug 18, which force has a component tending to urge the plug off of its seat 16, i. e., move the plug axially in the direction of its larger end. The effective area of each channel 56 acted upon by such pressure is substantially equal to the width of each channel times the difference between the distance from the axis of the plug 18 to the bottom of the channel where it connects with the groove 42 and the distance from the axis of the plug to the bottom of the channel where it connects with the groove 44. In other words, such area is substantially equal to that encompassed by a projection of the area of the bottom of each channel 56 parallel to the plug axis.

In addition to the foregoing pressure-affected areas of the plug 18 acted upon by lubricant pressure to urge the plug off its seat 16, it will be seen that lubricant pressure is also effective in the O-ring grooves 42 and 44 to exert unseating forces on the plug. Thus, for example, it will be seen that because of the taper of the plug 18 and seat 16, the effective annular area of the O-ring 48 acted upon by lubricant pressure in the groove 44 in a direction to unseat the plug 18 is greater than the corresponding effective annular area of the groove walls acted upon by lubricant pressure in a direction to seat the plug, as may best be seen by an inspection of Fig. 5. The same is true of the groove 42 at the small end of the plug 18 whenever the seat relief 52 is small, i. e. the effective annular area of the O-ring 46 acted upon by lubricant pressure in the groove 42 in a direction to seat the plug 18 is smaller than the corresponding effective annular area of the groove walls acted upon by lubricant pressure in a direction to unseat the plug, as may be seen by an inspection of Figure 4.

It thus will be seen that in the absence of this invention if lubricant is introduced into the lubricant system of the valve under a pressure high enough to overcome the plug-seating force of the spring 30, the plug 18 will be moved off its seat 16 and result in an extrusion of lubricant from the grooves 42 and 44 and channels 56 into the space between the thus-separated opposed sealing surfaces of the plug and seat, which extruded lubricant will then spread in a relatively thick film over such sealing surfaces. Thus, all lubricant pressure will be lost from the system and lubricant will be dissipated into the casing ports 14. As aforedescribed, this is a highly undesirable result, particularly in a curb stop, both because of the difficulty of replenishing the lubricant in such stops and the desirability of maintaining the lubricant therein under pressure.

In order to avoid the aforedescribed undesirable result, this invention provides means operated by pressure of the lubricant in the system for counteracting the aforedescribed unseating pressure forces of the lubricant on the plug 18. Thus, an axial bore 62 extends into the larger end of the plug 18, but terminates short of the transverse flow passage 20 in the plug. Slidably mounted in the bore 62 is a piston 64 which projects therefrom into abutting engagement with the inner surface of the closure cap 24. Preferably, the piston 64 is sealed to the bore 62, as by a circumferential groove 66 in the piston having an O-ring 68 therein for sealing engagement with both the bottom of such groove and the opposed surface of the bore 62. The inner end of the bore 62, together with the inner end of the piston 64, forms a pressure chamber 70 which is in communication with the lubricant system of the valve, as by a radial passageway 72 in the plug 18 leading to the bottom of the lubricant groove 44 at the inner side of the O-ring 48 therein.

It will be seen that lubricant under pressure in the chamber 70 exerts a seating force on the plug 18. Preferably, the cross sectional area of the bore 62 is substantially equal to the sum of the effective areas of the O-ring grooves 42 and 44 and the lubricant channels 56 acted upon by lubricant pressure in the system to develop a plug-unseating force. In other words, the area of the bore 62 is not large enough to take into account the plug-unseating forces developed by the pressure of a thick film of lubricant spread over the entire areas of the sealing surfaces of the plug 18 and seat 16 between the grooves 42 and 44. Compensating for this factor is unnecessary, because if the plug 18 becomes unseated enough for a pressurized film of lubricant to spread over and between the entire sealing surfaces of the plug and seat 16, the pressure of such film will almost immediately be lost by dissipation through the casing ports 14.

It thus will be seen that the objects of this invention have been fully and effectively accomplished. It will be realized, however, that the foregoing specific embodiment has been shown and described only for the purpose of illustrating the principles of this invention and is subject to extensive changes without departure from such principles. Therefore, this invention includes all modifications encompassed within the spirit and scope of the following claims.

I claim:

1. In a rotary plug valve having a casing provided with a tapered plug seat, a tapered plug rotatably seated therein, means defining a closed lubricant system including lubricant groove means between the opposed sealing surfaces of the plug and seat, lubricant pressure in the system developing an unseating force on the plug, and means other than the pressure of lubricant in the system for yieldingly urging the plug to seat, the combination of cylinder and piston means operated by the pressure of lubricant in the system for urging the plug to seat in order to substantially counteract the lubricant plug-unseating pressure force.

2. A rotary plug valve comprising: a casing having a tapered plug seat provided with at least one flow port, a correspondingly tapered valve plug rotatably seated in said seat and having at least one flow port movable into and out of alignment with said seat port; means defining a closed lubricant system for said valve including lubricant groove means between the opposed surfaces of said plug and seat, pressure in said system developing an unseating force on said plug; means other than the pressure of lubricant in said system for yieldingly urging said plug to seat; and means operated by the pressure of lubricant in said system for substantially counteracting said lubricant plug-unseating pressure force.

3. The structure defined in claim 2 in which the counteracting means includes means defining a chamber having a portion of the walls thereof fixed to the casing against movement in the direction of unseating movement of the plug and the remaining portion of the walls thereof fixed to said plug for movement therewith, pressure in said chamber being effective on said remaining wall portion to develop a plug-seating force, and duct means for communicating to said chamber the pressure of the lubricant in the system.

4. The structure defined in claim 2 in which the counteracting means includes a piston slidable in a longitudinal bore extending into the larger end of the plug and having a closed inner end, means fixed relative to the casing and engaging the outer end of said piston to prevent outward movement thereof relative to said casing, and duct means for communicating to said bore, inwardly of said piston, the pressure of the lubricant system.

5. A rotary plug valve comprising: a casing having a tapered plug seat provided with at least one flow port, a correspondingly tapered valve plug rotatably seated in said seat and having at least one flow port movable into and out of alignment with said seat port; means defining a closed lubricant system for said valve including lubricant groove means between the opposed surfaces of said plug and seat, pressure in said system developing an unseating force on said plug; means for maintaining pressure on the lubricant in said system; means other than the pressure of lubricant in said system for yieldingly urging said plug to seat; and means operated by the pressure of lubricant in said system for substantially counteracting said lubricant plug-unseating pressure force.

6. A rotary plug valve comprising: a casing having a tapered plug seat provided with at least one flow port, a correspondingly tapered valve plug rotatably seated in said seat and having at least one flow port movable into and out of alignment with said seat port; means defining a closed lubricant system for said valve including lubricant groove means between the opposed surfaces of said plug and seat, pressure in said system developing an unseating force on said plug; lubricant pressure accumulator means connected to said system; means other than the pressure of lubricant in said system for yieldingly urging said plug to seat; and means operated by the pressure of lubricant in said system for substantially counter-acting said lubricant plug-unseating pressure force.

7. A rotary plug valve comprising: a casing having a tapered plug seat provided with at least one flow port; a correspondingly tapered valve plug rotatably seated in said seat and having at least one flow port movable into and out of alignment with said seat port, the opposed annular surfaces of said plug and seat being in sealing engagement for at least major portions of their lengths; means defining a closed lubricant system for said portions including at least one longitudinal lubricant groove interrupting said opposed surfaces and extending substantially the length of said portions, lubricant pressure in said system developing an unseating force on said plug; resilient means effectively engaged with said casing and said plug for yieldingly urging the latter to seat; and means operated by the pressure of lubricant in said system for developing a seating force on said plug effective to substantially counteract said lubricant pressure unseating force on the latter.

8. A rotary plug valve comprising: a casing having a tapered plug seat provided with at least one flow port; a correspondingly tapered valve plug rotatably seated in said seat and having at least one flow port movable into and out of alignment with said seat port, the opposed annular surfaces of said plug and seat being in sealing engagement for at least major portions of their lengths; means defining a circumferential groove in one of said surfaces at one end of said portions; a resilient pressure-deformable packing ring in said groove and engaging both the bottom thereof and the other of said surfaces, said ring being non-complementary to the outer side wall of said groove; longitudinal lubricant channel means interrupting said opposed surfaces and extending from said groove substantially the entire length of said portions to form with said groove a closed lubricant system for said surfaces, lubricant pressure in said system being effective to develop an unseating force on said plug; means other than the pressure of lubricant in said system for yieldingly urging said plug to seat; and means operated by the pressure of lubricant in said system for developing a seating force on said plug effective to substantially counterbalance said lubricant pressure unseating force on the latter.

9. A rotary plug valve comprising: a casing having a tapered plug seat provided with at least one flow port; a correspondingly tapered valve plug rotatably seated in said seat and having at least one flow port movable into and out of alignment with said seat port, the opposed annular surfaces of said plug and seat being in sealing engagement for at least major portions of their lengths; means defining circumferential packing grooves in one of said surfaces at both ends of said portions; a resilient pressure-deformable packing ring in each of said grooves and engaging both the bottom thereof and the other of said surfaces, said rings being non-complementary to the outer side walls of their corresponding grooves; longitudinal lubricant channel means interrupting said surfaces and extending between and connecting said grooves at the inner sides of said rings therein to form with said grooves a closed lubricant system for said surfaces, lubricant pressure in said system being effective to develop an unseating force on said plug; means other than the pressure of lubricant in said system for yieldingly urging said plug to seat; and means operated by the pressure of lubricant in said system for developing a seating force on said plug effective to substantially counterbalance said lubricant pressure unseating force on the latter.

10. The structure defined in claim 9 in which the counterbalancing means includes a piston slidable in a longitudinal bore extending into the larger end of the plug and having a closed inner end; means fixed relative to the casing and engaging the outer end of said piston to prevent outward movement thereof relative to said casing, and duct means connecting the inner end of said bore to the lubricant groove at the larger end of said plug inwardly of the ring in said groove.

References Cited in the file of this patent

UNITED STATES PATENTS

| | | |
|---|---|---|
| 1,416,732 | Martin | May 23, 1922 |
| 1,998,029 | Simpson | Apr. 16, 1935 |
| 2,653,791 | Mueller | Sept. 29, 1953 |
| 2,663,290 | Walder | Dec. 22, 1953 |

FOREIGN PATENTS

| | | |
|---|---|---|
| 396,638 | Great Britain | Aug. 10, 1933 |